Patented June 11, 1940

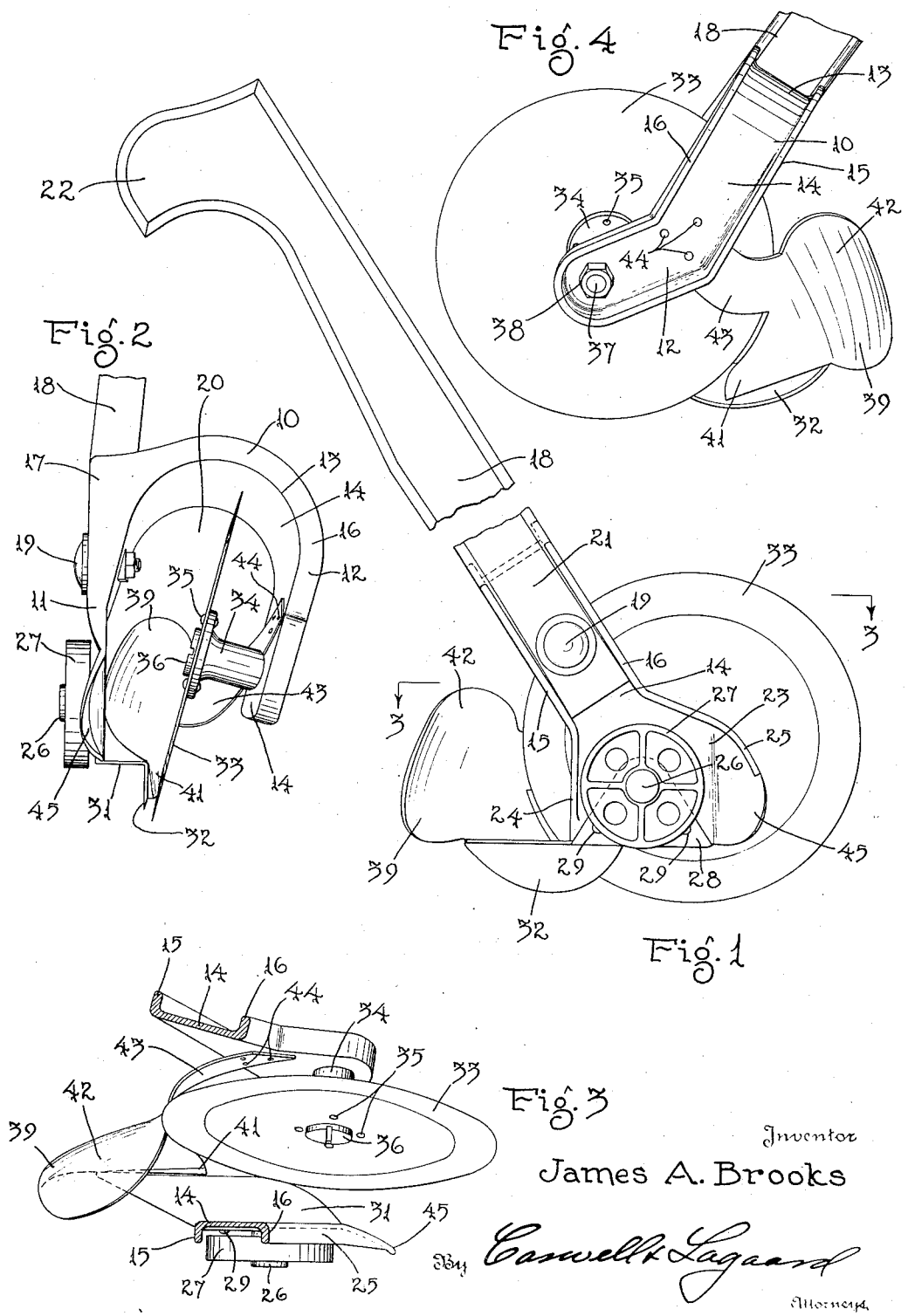

2,204,246

UNITED STATES PATENT OFFICE 2,204,246

LAWN EDGER

James A. Brooks, Minneapolis, Minn.

Application December 27, 1937, Serial No. 181,948

15 Claims. (Cl. 97—227)

My invention relates to lawn edgers and has for an object to provide a device by means of which the portion of the sod of a lawn adjacent the edge of a sidewalk may be quickly and conveniently removed.

Another object of the invention resides in providing a cutting disc and a blade angularly arranged with respect to one another and operating to remove the portion of the sod of a lawn adjacent the edge of the sidewalk.

A still further object of the invention resides in providing a frame for supporting the cutting disc and blade so that the same may be rigidly held with reference to one another.

Another object of the invention resides in providing a frame which offers a minimum amount of resistance to the passage of the cut sod through the device.

An object of the invention resides in providing a single frame member to which all of the various parts of the invention are attached.

A still further object of the invention resides in constructing said frame U-shaped in form and in disposing the cutting disc within the legs of said U-shaped frame member.

Another object of the invention resides in providing a shoe adapted to follow along the sidewalk and to which said blade is attached and in securing said shoe to said frame member.

A feature of the invention resides in providing a deflector at the forward edge of the frame member for directing the grass overlying the sidewalk into the space between the frame member and cutting disc.

Another object of the invention resides in providing a mold board operating in conjunction with said cutting disc and blade and directing the cut sod over upon the sidewalk.

A feature of the invention resides in constructing the frame channel-shaped in cross section and in arranging a handle between the flanges of said frame.

Other objects of the invention reside in the novel combination and arrangement of parts and in the details of construction hereinafter illustrated and/or described.

In the drawing:

Fig. 1 is a side elevational view of a sidewalk lawn edger illustrating an embodiment of my invention.

Fig. 2 is a front elevational view of a portion of the structure shown in Fig. 1.

Fig. 3 is a plan sectional view taken on line 3—3 of Fig. 1.

Fig. 4 is an elevational view, similar to Fig. 1 and viewed from the opposite side of the device.

My invention comprises a frame, which I have indicated in its entirety by the reference numeral 10. This frame is U-shaped in form, being constructed with spaced legs or reaches 11 and 12, provided with a space 20 therebetween and a curved connecting portion 13 connected to the same. The various frame members are channel shaped in cross section, as best shown in Fig. 3, and consists of a web 14, with flanges 15 and 16 issuing therefrom. These flanges extend outwardly from the web 14 which is disposed upon the interior of the frame and serve a purpose to be presently more fully described.

The leg 11 of the frame 10 is so arranged that the same extends upwardly in inclined relation. The two flanges 15 and 16 of said frame member run parallel and are enlarged, as indicated at 17. Between these flanges is arranged a handle 17 which is attached to the web 14 of the frame by means of a bolt 19. The end 21 of the handle 18 is snugly received between the flanges 15 and 16 and is rigidly held attached to the frame by the single bolt 19. The upper end of the handle 18 is provided with a hand grip 22 by means of which the device may be manipulated.

At the outermost end of leg 11 of frame 10 is a vertically extending plate 23 which lies in continuation of the web 14 of said leg. This plate has flanges 24 and 25 extending along the rear and upper edges of the same which join the flanges 15 and 16. Attached to this plate is a stud 26, on which is rotatably mounted a supporting wheel 27 which is confined within the space between the flanges 24 and 25 and which is disposed in close proximity to the plate 23. This wheel is adapted to ride along the upper surface of the sidewalk and supports the entire device for easy travel along the edge of the sidewalk.

Attached to the plate 23 is a bracket 28 which is secured thereto by means of rivets 29. This bracket has issuing outwardly from the lower edge thereof, a shoe 31 which overlies the upper surface of the sidewalk. This shoe extends inwardly into the space 20, formed between the reaches 11 and 12 of the frame 10, and terminates in a vertically extending blade 32, best shown in Figs. 1 and 2.

Cooperating with the blade 32 is a cutting disc 33, circular in form, which is attached to a flanged hub 34 by means of rivets 35 or otherwise. This hub is rotatably mounted on a stud 36 which is formed with a reduced portion 37. This portion of the hub extends through the web 14 of leg 12 and is attached to said leg by means of a nut 38 screwed upon the end of the same. Disc 33 is angularly arranged with respect to the blade 32 and serves to cut the portion of the sod adjacent the edge of the sidewalk as the edger is moved along the same.

For the purpose of directing the sod and earth severed by the cutting disc 33 back upon the side walk, a mold board 39 is employed which is constructed with a pointed end 41 adapted to follow along with the blade 32. The said mold board has a curved portion 42 which overhangs the sidewalk and which shifts material deposited against the same laterally upon the sidewalk. The mold board 39 is supported by means of a curved arm 43 integral therewith which arm is attached to web 14 of leg 12 of frame 10 by means of rivets 44.

At the forward end of the frame 10 is provided a deflector 45 which may be made integral with the plate 23 of leg 11 of frame 10. This deflector engages any grass or earth which may overlie the edge of the sidewalk and directs the same inwardly of the plate 23 and into the space 20 between the legs 11 and 12 of frame 10 where the same may be discharged rearwardly of the device in the same manner as the portion of the sod removed by the cutting disc 33 and blade 32. The shoe 31 and deflector 45 operate as a scoop for removing the sod overhanging the sidewalk.

The operation of the device is as follows. The lawn edger is arranged in a manner shown in Figs. 1 and 2 with the wheel 27 resting upon the upper surface of the sidewalk at the edge of the same where the sod is to be removed. The hand piece 22 is grasped in the right hand and the left hand applied to the handle 18 at a lower position. The entire device is then moved along the sidewalk and while being so moved the cutting disc 33 rotates and cuts the sod along a diagonal line. Blade 32 cooperates with the disc 33 to remove the section of sod and earth lying between it and the said disc and to discharge the same rearwardly. The pointed end 41 of mold board 39 elevates the earth so removed and the curved portion 42 of said mold board discharges the removed earth and sod back upon the sidewalk. In the event that any of the grass overhangs the sidewalk, the deflector 45 operates to shift the same back into the space 20 and inwardly of the plate 23 where the same may pass through the frame 10 and be deposited upon the sidewalk rearwardly of the device and together with the portion of the sod removed by the disc 33 and blade 32.

The advantages of my invention are manifest. An extremely simple and practical device is provided whereby the marginal portion of the sod adjacent the edge of a sidewalk may be neatly removed. The device, as constructed, offers a minimum amount of resistance to the use thereof. By means of the arrangement of parts, the sod and earth removed pass easily through the device and are discharged rearwardly of the same back upon the sidewalk. All of the parts being mounted on a single frame member, an extremely substantial and rigid construction results. My invention can be constructed at a nominal cost. There are no intricate or complicated parts to get out of order and aside from the sharpening of the cutting disc the device needs practically no attention.

Changes in the specific form of my invention, as herein disclosed, may be made within the scope of what is claimed without departing from the spirit of my invention.

Having described my invention, what I claim as new and desire to protect by Letters Patent is:

1. In a lawn edger, a U-shaped frame having two spaced reaches providing a space therebetween, said frame being channel-shaped in cross section and formed with a web and flanges issuing therefrom, said web being disposed upon the interior of the frame, a cutting disc disposed within said space, means for rotatably supporting said cutting disc, said means being attached to the web of one of said reaches and being free of the other reach, means cooperating with said disc to remove sod and a handle attached to said frame upon the exterior thereof and received between the flanges of the frame.

2. In a lawn edger, a U-shaped frame having two spaced reaches providing a space therebetween, said frame being channel-shaped in cross section and formed with a web and flanges issuing therefrom, said web being disposed upon the interior of the frame, a cutting disc disposed within said space, means for rotatably supporting said cutting disc, said means being attached to the web of one of said reaches, means cooperating with said disc to remove sod said means being carried by the web of the same reach, a supporting wheel attached to the web of the other reach of said frame and adapted to ride upon the upper surface of the sidewalk and a handle attached to the second reach of the frame and disposed substantially in alignment with the supporting wheel.

3. In a lawn edger, a U-shaped frame having two spaced reaches providing a space therebetween, said frame being channel-shaped in cross section and formed with a web and flanges issuing therefrom, said web being disposed upon the interior of the frame, a cutting disc disposed within said space, means for rotatably supporting said cutting disc, said means being attached to the web of one of said reaches, means cooperating with said disc to remove sod, a supporting wheel attached to the web of the other reach of said frame and adapted to ride upon the upper surface of the sidewalk and a handle received between the flanges of said frame and attached to the web thereof and disposed upon the exterior of the frame said supporting wheel being disposed substantially in alignment with said handle.

4. In a lawn edger, a one-piece U-shaped frame bent to provide two spaced reaches providing a space therebetween through which sod may pass, a cutting disc disposed within said frame and rotatably supported by one of said reaches and being free from the other reach, a handle secured to the other reach upon the exterior thereof and being free from the first named reach, a supporting wheel rotatably supported from the same reach as said handle and being disposed upon the exterior thereof, said wheel being disposed substantially in the plane of said handle and means carried by said frame and cooperating with said disc for removing the marginal portion of the sod adjacent the sidewalk.

5. In a lawn edger, a U-shaped frame having two spaced reaches providing a space therebetween, said frame being channel-shaped in cross section and formed with a web and flanges issuing therefrom, said web being disposed on the interior of the frame, a cutting disc disposed within said space and rotatably supported from one of said reaches, means cooperating with said disc to remove sod, a supporting wheel attached to the other reach of the frame and adapted to ride upon the upper surface of the sidewalk, a handle secured to the frame, the web of the second named reach at the lower end thereof being disposed in proximity to the sidewalk and being bent outwardly to form a deflector for deflecting the sod overhanging the edge of the sidewalk and a shoe cooperating with said deflector and secured to said same web for assisting in directing the overhanging sod inwardly and into the space between said reaches.

6. In a lawn edger, a U-shaped frame having two spaced reaches providing a space therebetween, said frame being channel-shaped in cross section and formed with a web and flanges issuing therefrom, said web being disposed on the interior of the frame, a cutting disc disposed within said space and rotatably supported from one of said reaches, means cooperating with said disc to remove sod, a supporting wheel attached to the other reach of the frame and adapted to ride upon the upper surface of the sidewalk, a handle secured to the frame, the web of the second named reach at the lower end thereof being disposed in proximity to the sidewalk and being bent outwardly to form a deflector for deflecting the sod overhanging the edge of the sidewalk and into the space between said reaches.

7. In a lawn edger, a frame, a shoe carried by said frame and adapted to travel above the upper surface of the sidewalk, a blade carried by said shoe and following along the edge of the sidewalk and extending in the direction of travel of the edger, a cutting disc rotatably mounted on said frame, the up and down diameter of said cutting disc forming an angle with the vertical and the horizontal diameter of said cutting disc forming an angle with the direction of travel of the edger and direction of extent of said blade.

8. In a lawn edger, a frame, a shoe carried by said frame and adapted to travel above the upper surface of the sidewalk, a blade carried by said shoe and following along the edge of the sidewalk and extending in the direction of travel of the edger, a cutting disc rotatably mounted on said frame, the up and down diameter of said cutting disc forming an angle with the vertical and the horizontal diameter of said cutting disc forming an angle with the direction of travel of the edger and the direction of extent of said blade, the planes of said blade and disc converging in the direction of travel of the edger.

9. In a lawn edger, a U-shaped frame having two spaced reaches providing a space therebetween, a supporting wheel carried by one of said reaches and adapted to ride upon the sidewalk, a handle secured to the same reach, the plane of said frame being parallel with the axis of said handle, the other of said reaches having an extension extending out of the plane of said U-shaped frame and a cutting disc disposed within said space and rotatably mounted on said extension.

10. In a lawn edger, a U-shaped frame having two spaced reaches providing a space therebetween, said frame being channel-shaped in cross section and formed with a web and flanges issuing therefrom, said web being disposed upon the interior of the frame, a cutting disc disposed within said space, means for rotatably supporting said cutting disc, said means being attached to the web of one of said reaches and being free of the other reach, means cooperating with said disc to remove sod, the web of the other of said reaches being enlarged at its lower end and the flanges thereof flaring outwardly, a supporting wheel rotatably mounted on said web and disposed between said flanges and a handle secured to said frame.

11. In a lawn edger, a frame, a blade carried by said frame and following along the edge of the sidewalk and extending in the direction of travel of the edger, a cutting disc rotatably mounted on said frame, the up and down diameter of said cutting disc forming an angle with the vertical and the horizontal diameter of said cutting disc forming an angle with the direction of travel of the edger and the direction of extent of said blade.

12. In a lawn edger, a frame, a blade carried by said frame and following along the edge of the sidewalk and extending in the direction of travel of the edger, a cutting disc rotatably mounted on said frame, the up and down diameter of said cutting disc forming an angle with the vertical and the horizontal diameter of said cutting disc forming an angle with the direction of travel of the edger and the direction of extent of said blade, the planes of said blade and disc converging in the direction of travel of the edger.

13. In a lawn edger, a frame, a shoe carried by said frame and adapted to travel above the upper surface of a sidewalk, a blade carried by said shoe and following along the edge of the sidewalk and extending in the direction of travel of the edger, a deflector extending upwardly from the foremost portion of the shoe and projecting forwardly in a direction away from the blade, and a cutting disc rotatably mounted on said frame and having its cutting edge extending in proximity to said blade.

14. In a lawn edger, a frame, cutting means carried by said frame, a supporting wheel carried by the frame and adapted to support the cutting means at proper elevation, and a deflector carried by said frame and disposed in advance of said supporting wheel, said deflector deflecting the overhanging portion of the vegetation to be cut out of the path of travel of the supporting wheel.

15. In a lawn edger, a frame, a blade carried by said frame and following along the edge of the sidewalk and extending in the direction of travel of the edger, a cutting disc rotatably mounted on said frame, the up and down diameter of said cutting disc forming an angle with the vertical and the horizontal diameter of said cutting disc forming an angle with the direction of travel of the edger and the direction of extent of said blade, the planes of said blade and disc converging in the direction of travel of the edger, and a moldboard having an edge following along the edge of said cutting disc at the divergent portion thereof, said moldboard extending up to the sidewalk and in alignment with said blade.

JAMES A. BROOKS.